(12) United States Patent
Kuboshima et al.

(10) Patent No.: US 6,758,039 B2
(45) Date of Patent: Jul. 6, 2004

(54) EXHAUST GAS CLEANING SYSTEM HAVING PARTICULATE FILTER

(75) Inventors: Tsukasa Kuboshima, Okazaki (JP); Shinichiro Okugawa, Toyota (JP); Makoto Saito, Okazaki (JP); Shigeto Yahata, Kariya (JP); Masumi Kinugawa, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/460,207

(22) Filed: Jun. 13, 2003

(65) Prior Publication Data

US 2003/0230077 A1 Dec. 18, 2003

(30) Foreign Application Priority Data

Jun. 14, 2002 (JP) ........................................ 2002-174553

(51) Int. Cl.[7] .................................................. F01N 3/02
(52) U.S. Cl. ........................................... 60/311; 60/297
(58) Field of Search ............................ 60/295, 297, 311

(56) References Cited

U.S. PATENT DOCUMENTS

| | | | | |
|---|---|---|---|---|
| 4,492,079 A | * | 1/1985 | Takagi et al. ............... | 60/274 |
| 4,835,963 A | * | 6/1989 | Hardy ............................ | 60/274 |
| 5,195,316 A | * | 3/1993 | Shinzawa et al. .............. | 60/274 |
| 5,287,698 A | * | 2/1994 | Shinzawa et al. .............. | 60/286 |
| 5,319,930 A | * | 6/1994 | Shinzawa et al. .............. | 60/286 |
| 6,304,815 B1 | * | 10/2001 | Moraal et al. ............... | 701/115 |
| 6,405,528 B1 | * | 6/2002 | Christen et al. .............. | 60/295 |
| 6,438,948 B2 | * | 8/2002 | Ono et al. ..................... | 60/311 |
| 6,497,095 B2 | * | 12/2002 | Carberry et al. .............. | 60/295 |
| 6,546,721 B2 | * | 4/2003 | Hirota et al. .................. | 60/297 |

FOREIGN PATENT DOCUMENTS

| | | |
|---|---|---|
| JP | 7-332065 | 12/1995 |
| JP | 11-13455 | 1/1999 |

\* cited by examiner

*Primary Examiner*—Thomas Denion
*Assistant Examiner*—Diem Tran
(74) *Attorney, Agent, or Firm*—Nixon & Vanderhye P.C.

(57) ABSTRACT

In an exhaust gas cleaning system of an internal combustion engine having a diesel particulate filter (DPF), measuring accuracy of a collection quantity of particulate matters collected by the DPF is estimated based on an accelerator position change rate and an exhaust gas flow rate. When the measuring accuracy is high, the collection quantity is calculated based on a pressure difference and the exhaust gas flow rate at the DPF. If the measuring accuracy is low, an increment value of the collection quantity is calculated based on a quantity of the particulate matters discharged from an engine main body. Then, the collection quantity is calculated by adding the collection quantity increment value to the previous collection quantity calculated based on the pressure difference and the exhaust gas flow rate while the measuring accuracy is high.

6 Claims, 5 Drawing Sheets

EXHAUST GAS CLEANING SYSTEM HAVING PARTICULATE FILTER

CROSS REFERENCE TO RELATED APPLICATION

This application is based on and incorporates herein by reference Japanese Patent Application No. 2002-174553 filed on Jun. 14, 2002.

BACKGROUND OF THE INVENTION

1. Field of the Invention

The present invention relates to an exhaust gas cleaning system for an internal combustion engine, in particular, to a method of regenerating a particulate filter.

2. Description of Related Art

Lately, improvement in exhaust emission of an internal combustion engine mounted on a vehicle and the like is required. Specifically, exhaust particulate matters such as soot or a soluble organic fraction included in the exhaust gas discharged from a compression-ignition type diesel engine running on diesel oil should be removed, as well as carbon oxide, hydrocarbon and nitrogen oxide. Therefore, a particulate filter made of a porous material is disposed in an exhaust passage of the diesel engine for collecting the exhaust particulate matters included in the exhaust gas.

When the exhaust gas passes through porous filter walls of the particulate filter, the particulate matters included in the exhaust gas are filtered at surfaces or pores of the filter walls. If an excessive quantity of the particulate matters is collected, flow resistance at the particulate filter may increase. As a result, back pressure of the engine may be increased, and the engine output may be decreased. Therefore, ability of the particulate filter to collect the exhaust particulate matters should be recovered by regenerating the particulate filter. The particulate filter is regenerated by eliminating the collected exhaust particulate matters.

A particulate filter having an oxidation catalyst such as platinum thereon can be regenerated during the operation of the engine with the use of an oxidization effect of the oxidization catalyst. For instance, a post-injection for injecting fuel in an expansion stroke of the engine is performed at a predetermined timing in order to provide the fuel to the particulate filter. The temperature of the oxidization catalyst is increased with the use of heat, which is generated by combusting the fuel. Thus, the collected particulate matters are eliminated. Otherwise, the timing of the normal fuel injection is retarded to decrease efficiency of the engine. Thus, waste heat, which is not converted into motive energy, is increased, and the temperature of the oxidization catalyst is increased with the use of the waste heat. Thus, the particulate matters depositing in the particulate filter are combusted and eliminated.

In a method disclosed in Japanese Patent Unexamined Publication No. H11-13455 (first example), a quantity of exhaust particulate matters generated in an internal combustion engine main body is calculated based on measured engine rotation speed and a flow rate of fuel. Then, a quantity of the exhaust particulate matters collected by the particulate filter is estimated by integrating the quantity of the particulate matters generated in the engine. In this method, a map relating the engine rotation speed and the fuel flow rate with the quantity of the generated exhaust particulate matters is used. Data in the map are obtained by calculating a generating quantity of the exhaust particulate matters based on various rotation speeds and flow rates of the fuel, through benchmark tests and the like.

However, in order to measure the quantity of the collected particulate matters precisely, accuracy of the map has to be improved by minutely segmenting the engine rotation speed and the flow rate of the fuel. Since the data of the map are obtained in a steady operating state, an error will be generated if the map is used in a transitional state. The transitional state is formed many times until the quantity of the collected particulate matters increases up to a level at which regeneration of the particulate filter is required. Therefore, the errors are accumulated, and timing of the regeneration may become erroneous.

In another method disclosed in Japanese Patent Unexamined Publication No. H07-332065 (second example), timing to start the regeneration of the particulate filter is determined based on a pressure difference between an inlet and an outlet of the particulate filter. The flow resistance at the particulate filter increases as the quantity of the collected particulate matters increases. The pressure difference increases as the flow resistance increases. Therefore, it is determined that the regeneration should be started at the timing when the pressure difference exceeds a predetermined value.

However, the pressure difference is small if the flow rate of the exhaust gas passing through the particulate filter is small. Therefore, the collection quantity of the particulate matters cannot be necessarily measured with adequate accuracy. Moreover, a steady pressure difference cannot be obtained in the transitional state. As a result, the measuring accuracy may be deteriorated.

SUMMARY OF THE INVENTION

It is therefore an object of the present invention to provide an exhaust gas cleaning system for an internal combustion engine capable of determining timing for regenerating a particulate filter appropriately.

According to an aspect of the present invention, an internal combustion engine has a particulate filter, which is disposed in an exhaust pipe for collecting particulate matters included in the exhaust gas discharged from cylinders of an engine main body and is regenerated at a predetermined timing by eliminating the collected particulate matters. An exhaust gas cleaning system of the engine has passing state detecting means, operating state detecting means, measuring accuracy determination value calculating means, measuring accuracy determining means, first collection quantity calculating means, collection quantity increment value calculating means, second collection quantity calculating means, regeneration determining means and regeneration performing means. The passing state detecting means detects a passing state of the exhaust gas through the particulate filter. The operating state detecting means detects an operating state of the engine main body. The measuring accuracy determination value calculating means calculates a measuring accuracy determination value based on the detected operating state or the detected passing state. The measuring accuracy determining means determines whether the measuring accuracy of a collection quantity of the collected particulate matters is higher than a threshold measuring accuracy or not by comparing the measuring accuracy determination value with a predetermined value. The first collection quantity calculating means calculates the collection quantity based on the detected passing state of the exhaust gas when the measuring accuracy is determined to be higher than the threshold measuring accuracy. The collection quantity increment value calculating means calculates a discharge quantity per unit time of the particulate matters discharged from the engine main body based on the detected operating state of the engine main body. The collection quantity increment value calculating means also calculates a collection quantity increment value per unit time from the calculated discharge quantity per unit time when the measuring accuracy is determined to be lower than the threshold measuring accuracy. The second collection quantity calculating means calculates the collection quantity by adding the collection quantity increment value to the previous collection quantity when the measuring accuracy is determined to be lower than the threshold measuring accuracy. The regeneration determining means determines whether the collection quantity, which is calculated by the first or second collection quantity calculating means, is greater than a threshold collection quantity or not. The regeneration performing means performs the regeneration of the particulate filter if the collection quantity is determined to be greater than the threshold collection quantity.

When the engine is in a steady operating state and the measuring accuracy is high, the collection quantity of the particulate matters is calculated based on the passing state of the exhaust gas at the particulate filter. If the operating state becomes transitional and the measuring accuracy decreases, the collection quantity at that time is calculated by accumulating the collection quantity increment values with a base portion. The base portion is the collection quantity calculated based on the passing state of the exhaust gas while the measuring accuracy is high. The collection quantity increment value is calculated based on a quantity of the discharged particulate matters, which is estimated from the operating state of the engine main body. Therefore, a most part of the measurement error of the collection quantity is included in the accumulated collection quantity increment values, which are calculated after the last calculation of the collection quantity based on the passing state of the exhaust gas. Therefore, the entire errors of the collection quantity increment values since the system was used first time do not accumulate unlike the first example of the related art. In the first example, the entire errors of the collection quantity increment values will accumulate because the present collection quantity is calculated by accumulating the collection quantity increment values since the first use of the system (or since the last regeneration of the system).

The base portion of the collection quantity is the collection quantity previously calculated based on the passing state of the exhaust gas at the particulate filter when the engine is in the steady operating state and the measuring accuracy is high. Therefore, generation of a great error can be prevented regardless of the operating condition of the engine main body, unlike the second example of the related art. In the second example, a great error may be generated in some operating conditions because the present collection quantity is calculated based on the passing state of the exhaust gas at the particulate filter at the time when the present collection quantity is calculated.

BRIEF DESCRIPTION OF THE DRAWINGS

Features and advantages of embodiments will be appreciated, as well as methods of operation and the function of the related parts from a study of the following detailed description, the appended claims, and the drawings, all of which form a part of this application. In the drawings:

DETAILED DESCRIPTION OF THE REFERRED EMBODIMENT (First Embodiment)

Figure 1:
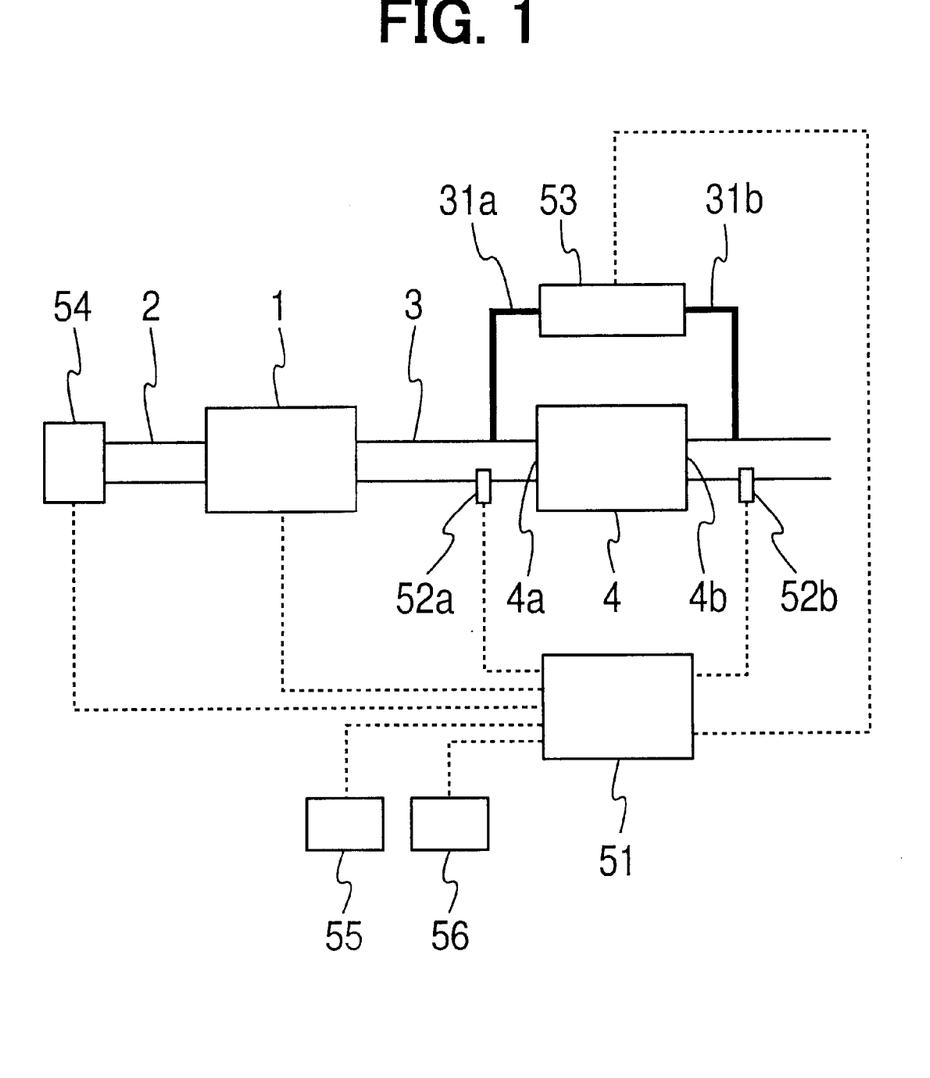
FIG. 1 is schematic diagram showing an internal combustion engine having an exhaust gas cleaning system according to a first embodiment of the present invention.

Referring to FIG. 1, a diesel engine having an exhaust gas cleaning system according to the first embodiment is illustrated. An engine main body 1 is connected with an intake passage 2, through which intake air passes, and with an exhaust passage 3, through which exhaust gas passes. A diesel particulate filter (DPF) 4 is disposed in the exhaust passage 3. A filter main body of the DPF 4 is a honeycomb made of a porous ceramics such as cordierite or silicon carbide. An inlet or an outlet of each passage of the honeycomb body is blocked. The exhaust gas discharged from the respective cylinders of the engine main body 1 enters the DPF 4 through an inlet 4a of the DPF 4 and passes through porous filter walls, then, flows downstream through an outlet 4b of the DPF 4. At that time, exhaust particulate matters included in the exhaust gas are collected by the DPF 4, and deposit in the DPF 4. An oxidization catalyst, whose main component is a noble metal such as platinum or palladium, is supported on a surface of the filter main body of the DPF 4. Thus, the particulate matters are eliminated by oxidization and combustion under predetermined temperature conditions.

An electronic control unit (ECU) 51 for controlling various parts of the engine main body 1 such as injectors is disposed. The ECU 51 has a general structure, which mainly includes a microcomputer.

The ECU 51 receives various signals indicating an operating state of the engine. For instance, the ECU 51 receives signals from temperature sensors 52a, 52b as means for measuring temperature of the exhaust gas. The temperature sensors 52a, 52b are disposed so that they penetrate a passage wall of the exhaust passage 3. The temperature sensor 52a is disposed just upstream of the DPF 4, and the temperature sensor 52b is disposed just downstream of the DPF 4. The upstream temperature sensor 52a measures DPF inlet temperature, or the temperature of the passing exhaust gas at the inlet 4a of the DPF 4. The downstream temperature sensor 52b measures DPF outlet temperature, the temperature of the passing exhaust gas at the outlet 4b of the DPF 4.

The ECU 51 calculates DPF temperature T from the DPF inlet temperature and the DPF outlet temperature. The DPF temperature T represents temperature of the DPF 4 and is correlated with the temperature of the filter main body and the oxidization catalyst supported on the filter main body. The DPF temperature T is an averaged value of the DPF outlet temperature and an output value provided by applying a first order lag filter calculation to the DPF inlet temperature. The DPF inlet temperature is applied with the first order lag filter calculation in order to eliminate an effect of its fluctuation, which depends on a discharging state of the exhaust gas from the engine main body 1. Depending on required specifications, the DPF temperature T may be simply an averaged value or a weighted average of the DPF inlet temperature and the DPF outlet temperature. Any temperature may be employed as the temperature T if it represents the temperature of the DPF 4.

A first branch passage 31a and a second branch passage 31b are connected to the exhaust passage 3. The first branch passage 31a branches from the exhaust passage 3 at a portion just upstream of the DPF 4. The second branch passage 31b branches from the exhaust passage 3 at a portion just downstream of the DPF 4. A pressure difference sensor 53 disposed between the first and second branch passages 31a, 31b measures the pressure difference between the inlet 4a and the outlet 4b of the DPF 4. The pressure difference is an exhaust gas pressure, which increases as a pressure loss at the DPF 4 increases. The pressure loss increases as the quantity of the particulate matters collected in the DPF 4 (PM collection quantity) increases.

An airflow meter 54 is disposed in the intake passage 2 for measuring the flow rate of the intake air (intake airflow rate). An accelerator position is measured based on an output signal outputted from an accelerator position sensor 55. An engine rotation speed is measured based on an output signal outputted from a crank angle sensor 56.

Figure 2:
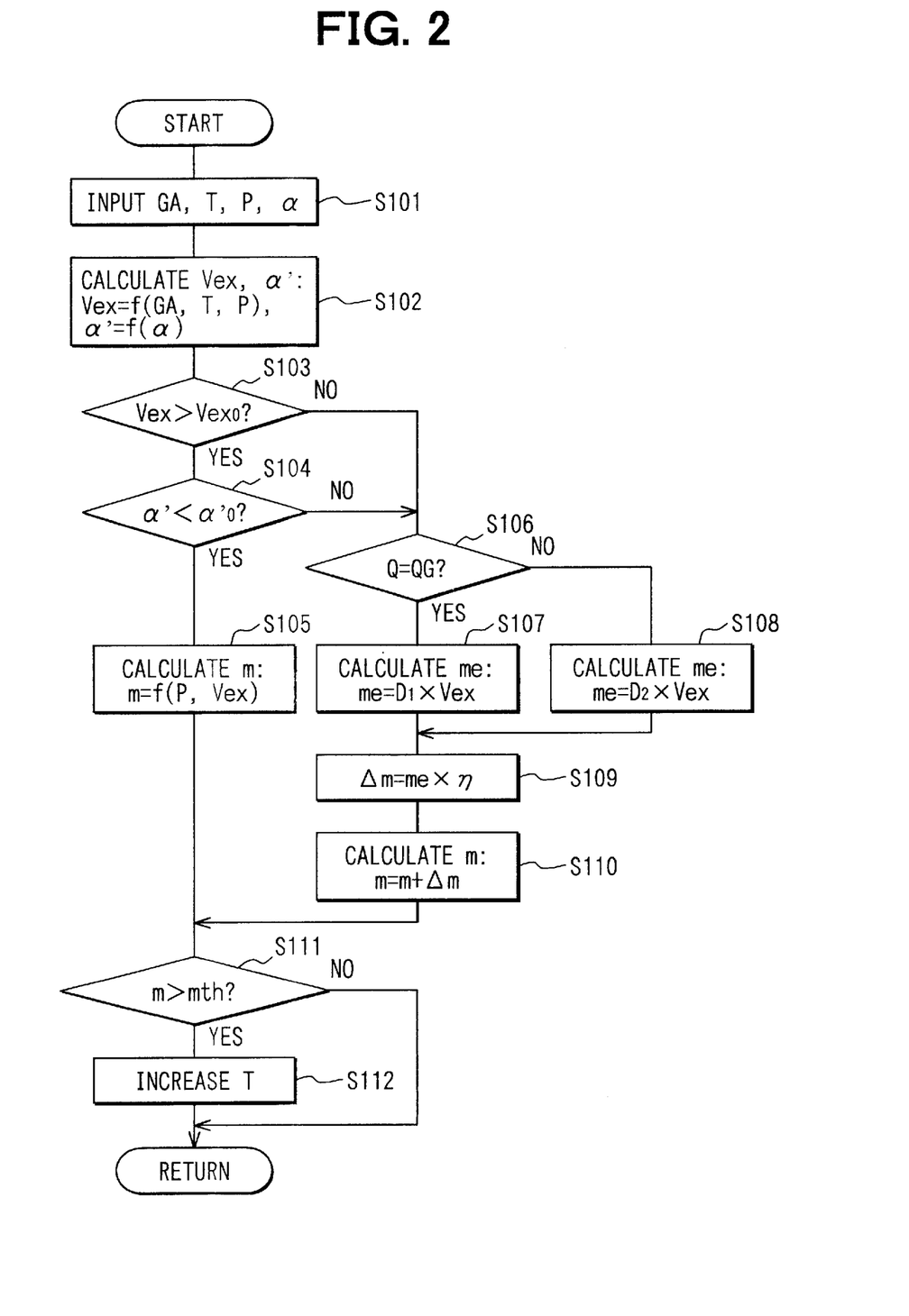
FIG. 2 is a flowchart showing control performed by an electronic control unit of the engine according to the first embodiment.

Next, regeneration control of the DPF 4 performed by the ECU 51 will be explained based on a flowchart shown in FIG. 2. The flowchart in FIG. 2 is a program, which is started at a predetermined interval with a timer interruption. First, in Step S101, the intake airflow rate GA (weight flow rate), the DPF temperature T, the pressure difference P and the accelerator position α are inputted.

Then, in Step S102, the exhaust gas flow rate Vex is calculated based on the intake airflow rate GA, the DPF temperature T and the pressure difference P. Thus, the intake airflow rate GA in the weight flow rate is converted into a volume flow rate based on the DPF temperature T and the pressure difference P. Meanwhile, an accelerator position change rate α', or a rate of change in the accelerator position α, is calculated in Step S102. The accelerator change rate α' is a difference between the present accelerator position a and the previous accelerator position α, for instance. The accelerator position change rate α' becomes positive when the vehicle is accelerated, and becomes negative when the vehicle is decelerated. In the embodiment, only the scale of the accelerator position change rate α' is used.

Then, in Step S103, it is determined whether the exhaust gas flow rate Vex is greater than a predetermined value vex0 or not. If the result of the determination in Step S103 is "YES", the processing proceeds to Step S104. In Step S104, it is determined whether the accelerator position change rate α' is less than a predetermined value α'0 or not. If the result of the determination in Step S104 is "YES", the processing proceeds to Step S105.

Figure 3:
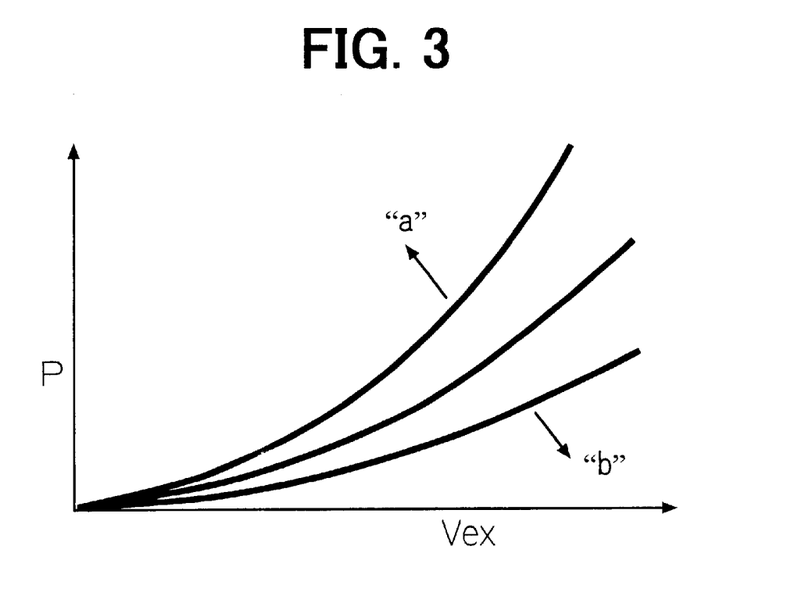
FIG. 3 is a graph showing a relation among a collection quantity of particulate matters, an exhaust gas flow rate and a pressure difference.

In Step S105, the PM collection quantity m is calculated based on the exhaust gas flow rate Vex and the pressure difference P. Then, the processing proceeds to Step S111. The PM collection quantity m is calculated based on a map store in ROM of the ECU 51. The map is shown in FIG. 3. Each solid line in FIG. 3 shows a relation between the exhaust gas flow rate Vex and the pressure difference P, which provides an identical PM collection quantity m. When the PM quantity m is identical, the pressure difference P decreases as the exhaust gas flow rate Vex decreases as shown in FIG. 3. Data in the map are obtained in advance through experimentation and the like. In FIG. 3, the PM collection quantity m increases in a direction shown by an arrow mark "a", and decreases in a direction shown by another arrow mark "b".

If the determination in Step S103 or Step S104 is determined negatively, the processing proceeds to Step S111 after performing the steps from Step S106 to Step S110. More specifically, Step S105 is performed only when the exhaust gas flow rate Vex is greater than the predetermined value Vex0 and the accelerator position change rate α' is less than the predetermined value α'0.

If the exhaust gas flow rate Vex is small, an adequate pressure difference is not generated at the DPF 4. In such a case, a measurement error of the PM collection quantity is increased if the PM collection quantity m is calculated based on the pressure difference P and the exhaust gas flow rate Vex in Step S105. In a transitional state where the accelerator position α changes largely, the exhaust gas flow rate Vex and the pressure difference P become unstable. Therefore, the measurement error of the PM collection quantity m is increased as the accelerator position change rate α' increases if the PM collection quantity m is calculated in Step S105. The measuring accuracy of the PM collection quantity m can be determined to be adequate when the determinations in Step S103 and S104 are determined affirmatively. On the contrary, the measuring accuracy of the PM collection quantity m is determined to be inadequate when at least one of the determinations in Step S103 and Step S104 is determined negatively. Thus, only when the measuring accuracy of the PM collection quantity m is adequate, Step S105 is performed.

On the other hand, steps from Step S106 to Step S110 are performed to calculate the PM collection quantity m when the PM collection quantity m cannot be calculated with adequate accuracy in step S105 because the exhaust gas flow rate Vex is small or the accelerator change rate α' is large. In Step S106, it is determined whether a fuel injection quantity Q, which is a state quantity indicating the operating state, has reached a smoke guard injection quantity QG or not. The smoke guard injection quantity QG is a maximum value of a permissible fuel injection quantity for limiting a concentration of smoke discharged from the engine main body 1 below a predetermined guard concentration SG. The smoke guard fuel injection quantity QG is determined for each operating state such as the engine rotation speed or output torque. If the determination in Step S106 is determined affirmatively, the processing proceeds to Step S107. In Step S107, discharge quantity "me" of the exhaust particulate matters discharged from the engine main body 1 per unit time is calculated. The unit time is the time interval for starting the control flow shown in FIG. 2. Then, the processing proceeds to Step S109. If the determination in Step S106 is determined negatively, the discharge quantity "me" is calculated in Step S108, and then, the processing proceeds to Step S109.

The discharge quantity "me" is calculated in Step S107 or Step S108 as follows. In the calculation of the discharge quantity "me", a concentration (PM concentration) D1, D2 of the particulate matters included in the exhaust gas, which is discharged from the engine main body 1, is used. The PM concentration D1, D2 is a fixed value stored in the ROM of the ECU 51 and is read when an ignition switch is switched on.

The exhaust particulate matters discharged from the diesel engine include soot and a soluble organic fraction (SOF).

The SOF is a half-transparent component mainly including hydrocarbon, which can dissolve in an organic solvent. Generally, the smoke concentration of the exhaust gas does not correspond to a PM discharge quantity, or a quantity of the particulate matters discharged from the engine main body. It is because the SOF is seldom detected as the smoke even if it is detected as the exhaust particulate matters. However, the most part of the SOF collected by the DPF is combusted if the temperature of the DPF is increased to 200° C. or more. In such a case, there is no need to consider the SOF as a cause of the pressure loss at the DPF. Therefore, it is preferable to calculate the PM discharge quantity based on the soot concentration since the soot mainly contributes to the increase in the flow resistance at the DPF 4. In the embodiment, the PM concentration is determined in accordance with the concentration of the smoke discharged from the engine main body 1, because the soot concentration corresponds to the smoke concentration.

Figure 4:
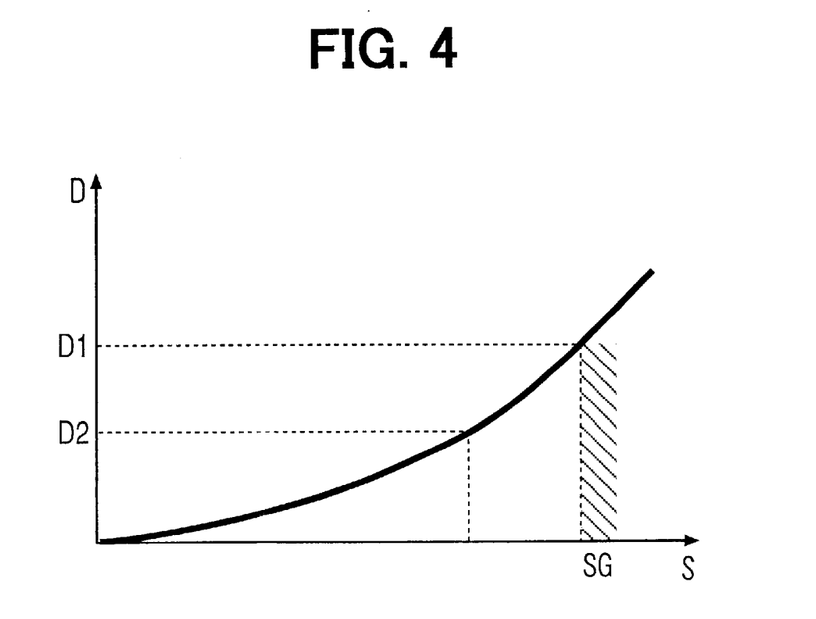
FIG. 4 is a graph showing a relation between smoke concentration and particulate matter concentration.

A graph in FIG. 4 shows a relation between the smoke concentration S and the PM concentration D in the exhaust gas, which contributes to the increase in the pressure loss at the DPF 4. The guard concentration SG is a smoke concentration at the time when the fuel injection quantity is the smoke guard injection quantity QG. Therefore, the guard concentration SG is the maximum value of the smoke concentration S. The first PM concentration D1 is set to a value corresponding to the guard concentration SG. The second PM concentration D2 is set to a value corresponding to a smoke concentration lower than the guard concentration SG. In the embodiment, if the fuel injection quantity Q reaches the smoke guard injection quantity QG, the first PM concentration D1 is used as the PM concentration of the exhaust gas discharged from the engine main body 1. If the fuel injection quantity Q has not reached the smoke guard injection quantity QG, the second PM concentration D2 is used as the PM concentration of the exhaust gas discharged from the engine main body 1. Thus, one of the discrete values is selected as the PM concentration in accordance with the fuel injection quantity Q.

In Step S107 or Step S108, the exhaust gas flow rate Vex is considered as the flow rate of the exhaust gas discharged from the engine main body 1. In Step S107, the discharge quantity "me" is calculated by multiplying the first PM concentration by the exhaust gas flow rate Vex (D1×Vex). On the other hand, in Step S108, the discharge quantity "me" is calculated by multiplying the second PM concentration D2 by the exhaust gas flow rate Vex (D2×Vex). The exhaust gas flow rate Vex is standardized to a flow rate whose unit time is the time interval for starting the control flow shown in FIG. 2.

It is determined whether the fuel injection quantity Q is equal to the smoke guard injection quantity QG or not in the fuel injection control. Therefore, Step S106 can be performed after receiving the information of the determination. Thus, the PM discharge quantity can be calculated simply, without using a detailed map and the like.

The control is simplified by setting the PM concentration in two steps. Preferably, a method of setting the values for the PM concentration should be optimized through experimentation and the like in order to reduce the error caused by selecting the PM concentration from discrete values. The PM concentration may be selected from three or more discrete values in accordance with the fuel injection quantity and the like. Alternatively, the PM concentration may be calculated with a continuous function in accordance with the fuel injection quantity and the like.

In Step S109, a collection quantity increment value Δm is calculated by multiplying the discharge quantity "me" by predetermined collection efficiency η. The collection quantity increment value Δm is a collection quantity of the particulate matters, whose unit time is equal to the time interval for starting the control flow shown in FIG. 2. The collection efficiency η is a ratio of the particulate matters collected by the DPF 4 relative to the quantity of the particulate matters discharged from the engine main body 1. The collection efficiency η varies in accordance with specifications of the DPF 4.

Then, in Step S110, the PM collection quantity m is renewed by adding the collection quantity increment value Am to the previous PM collection quantity m. Then, the processing proceeds to Step S111.

In Step S111, it is determined whether the PM collection quantity m is greater than a regeneration start PM collection quantity mth, which is a threshold. The regeneration start PM collection quantity mth is inputted when the ignition switch is switched on, for instance. The regeneration start PM collection quantity mth is a PM collection quantity at which the regeneration of the DPF 4 should be started. The regeneration start PM collection quantity is set as large as possible in a permissible range in order to inhibit the increase in the frequency of the regeneration. If the determination in Step S111 is determined affirmatively, the temperature T of the DPF 4 is increased to regenerate the DPF 4 in Step S112. The temperature T of the DPF 4 is increased by performing a post injection or by retarding the injection timing. If the determination in Step S111 is determined negatively, it is determined that the quantity of the collected particulate matter has not reached a level at which the regeneration of the DPF 4 is required, and Step S112 is not performed.

When the measuring accuracy of the PM collection quantity m calculated based on the pressure difference P and the exhaust gas flow rate Vex is adequate, the determinations in Step S103 and Step S104 are determined affirmatively. In this case, the PM collection quantity m used in the determination in Step S111 is the one calculated based on the pressure difference P and the exhaust gas flow rate Vex. If the operating state enters the transitional state and the measuring accuracy decreases, the determination in Step SS103 or Step S104 is determined negatively. In this case, the PM collection quantity m is the sum of the integrated collection quantity increment values Δm and a base portion. The base portion is the PM collection quantity m previously calculated in Step S105 based on the pressure difference P and the exhaust gas flow rate Vex while the measuring accuracy is adequate.

Therefore, the most part of the measurement error in the PM collection quantity m is included in the collection quantity increment values Δm. The collection quantity increment values Δm are accumulated only after the PM collection quantity m as the base portion is calculated based on the pressure difference P and the exhaust gas flow rate Vex. Therefore, no matter how many times the measuring accuracy becomes low due to acceleration and the like before the PM collection quantity m as the base portion is calculated, the PM collection quantity m does not include the measurement errors caused while the measuring accuracy is low.

In the normal operation, an accelerating state in which the accelerator position changes or an idling state in which the exhaust flow rate is very small does not continues for a long time. Therefore, the ratio of the error in the PM collection quantity relative to the entire PM collection quantity is relatively small.

Therefore, when the PM collection quantity m exceeds the regeneration start PM collection quantity mth, the actual quantity of the collected particulate matters does not differ largely from the regeneration start PM collection quantity mth. Accordingly, the regeneration can be performed at appropriate timing. More specifically, the entire errors included in the PM collection quantity since the first use of the system do not accumulate, unlike the first example of the related art. In addition, generation of a great error can be prevented regardless of the operating state of the engine main body 1 or the passing state of the exhaust gas, unlike the second example of the related art.

Figure 5:
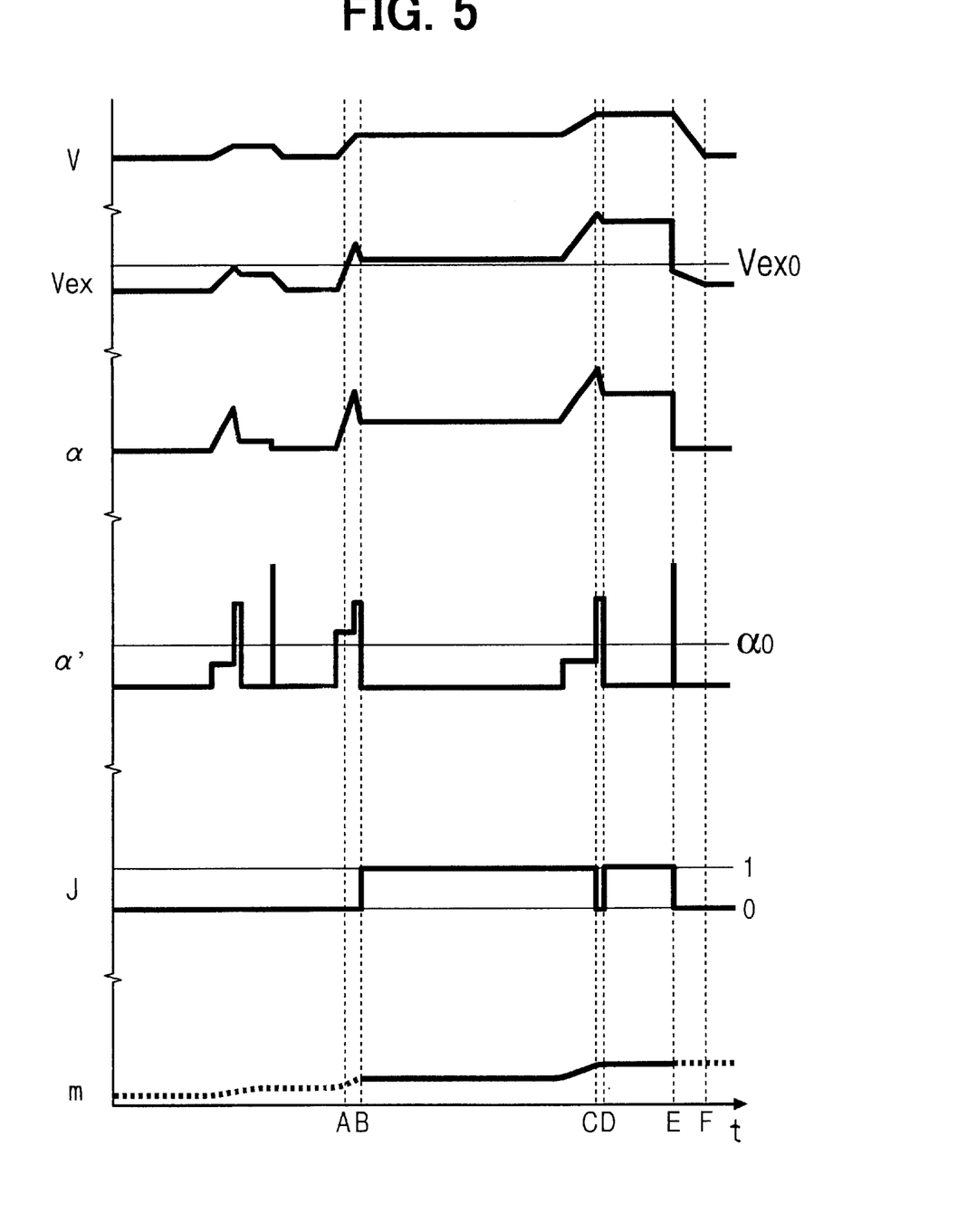
FIG. 5 is a time chart showing contents of the control performed by the electronic control unit according to the first embodiment.

A time chart in FIG. 5 shows an operating state of various parts of the diesel engine of the embodiment when the vehicle is running. In the operation shown in the time chart in FIG. 5, the pressing degree of the accelerator pedal is changed. In FIG. 5, the axis "V" represents the velocity of the vehicle, and the axis "J" represents a state of PM quantity calculation method switch flag J. When the flag J is 1, the PM collection quantity m is calculated in Step S105. When the flag J is 0, the PM collection quantity m is calculated in Step S110. Until a time point "A" in FIG. 5, the operating state is determined to be in the low measuring accuracy range (in Step S103) and the flag J is 0, because the exhaust gas flow rate Vex is less than the predetermined value Vex0. In the period until the time point "A", the exhaust flow rate Vex exceeds the predetermined value Vex0 for a moment due to a change in the accelerator position. However, the operating state is determined to be in the low measuring accuracy range (in Step S104) because the accelerator position change rate α' exceeds the predetermined value α'0 when the accelerator pedal is returned. Accordingly, the flag J remains 0.

Then, the accelerator position α increases from the time point "A" again, and the exhaust gas flow rate Vex exceeds the predetermined value Vex0. However, the accelerator pedal is pressed strongly and the accelerator position change rate α' exceeds the predetermined value α'0. When the accelerator pedal is returned slightly, the accelerator position change rate α' is also greater than the predetermined value α'0. Therefore, the flag J remains 0.

After that, if the accelerator position a is stabilized at a relatively high value, the accelerator position change rate α' is decreased greatly and the exhaust gas flow rate Vex remains at a relatively high value. Therefore, the operating state is determined to be in a high measuring accuracy range (in Step S103 and Step S104), and the flag J is changed to 1 at a time point "B". After that, the PM collection quantity m is precisely calculated based on the pressure difference P and the exhaust gas flow rate Vex. Therefore, if the actual PM collection quantity reaches the regeneration start PM collection quantity mth, the timing is comprehended precisely.

After that, if the accelerator position α increases gradually again and the accelerator change rate α' exceeds the predetermined value α'0 at a time point "C" when the accelerator pedal is returned, the flag J is changed to 0. The PM collection quantity m at the time is calculate by sequentially adding the collection quantity increment values Δm to the PM collection quantity m, which is calculated based on the pressure difference P and the exhaust gas flow rate Vex just before the flag J is changed to 0. As explained above, the measurement error in the PM collection quantity m consists of the error included in the PM collection quantity increment values Δm. Therefore, even if the actual PM collection quantity reaches the regeneration start PM collection quantity during the period, it can be comprehended generally at the actual timing.

After that, if the accelerator position a is stabilized at a relatively high value, the flag J is changed to 1 at a time point "D". Thus, the error included in the PM collection quantity increment values Δm provided until the timing are cancelled, and are not accumulated.

If the accelerator pedal is returned abruptly at a time point "E" and the exhaust gas flow rate Vex decreases rapidly below the predetermined value Vex0, the flag J is changed to 0. Then, the vehicle stops and makes transition to the idling state at a time point "F". After the time point "E", the PM collection quantity m at that time is calculated by sequentially adding the collection quantity increments Δm to the PM collection quantity m, which is calculated based on the pressure difference P and the exhaust gas flow rate Vex just before the flag J is changed to 0. As explained above, the measurement error in the PM collection quantity m generally consists of the errors included in the PM collection quantity increment values Δm. Therefore, even if the actual PM collection quantity reaches the regeneration start PM collection quantity during the period, it can be comprehended generally at the actual timing.

In the first embodiment, as a state quantity representing the passing state of the exhaust gas through the DPF 4, the flow resistance at the DPF 4 is employed. Alternatively, the output of the airflow meter, or the intake airflow rate, may be employed as the state quantity. The intake airflow rate decreases as the quantity of the depositing particulate matters increases even if the operating condition is identical. Therefore, the passing state of the exhaust gas through the DPF 4 can be determined from the intake airflow rate.

(Second Embodiment)

Figure 6:
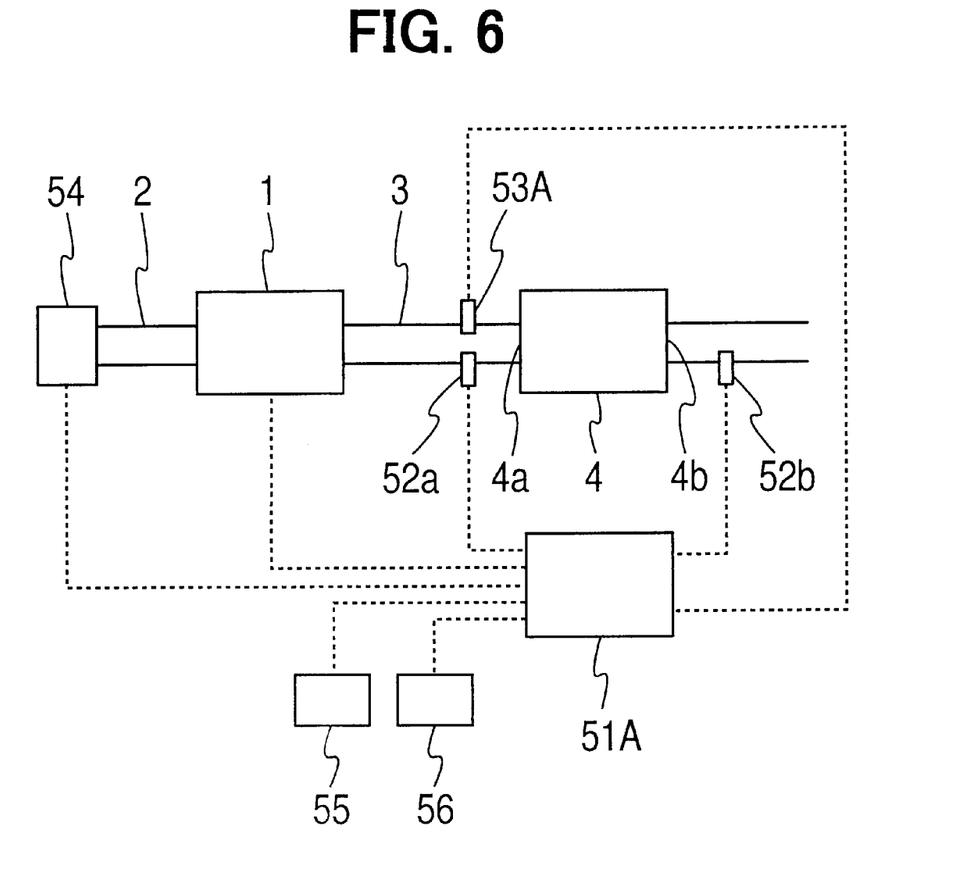
FIG. 6 is a schematic diagram showing an internal combustion engine having an exhaust gas cleaning system according to a second embodiment of the present invention.

In FIG. 6, an internal combustion engine having an exhaust gas cleaning system according to the second embodiment is illustrated.

A pressure sensor 53A is disposed just upstream of the DPF 4 for measuring the pressure of the exhaust gas passing through the exhaust pipe 3 at the point. An ECU 51A stores a map of a relation between the exhaust gas pressure just upstream of the DPF 4 and the PM collection quantity. Thus, the PM collection quantity is provided in accordance with the pressure measured by the pressure sensor 53A. The ECU 51A calculates the PM collection quantity based on the pressure measured by the pressure sensor 53A during the measuring accuracy is high.

The pressure just downstream of the DPF 4 is a sum of the atmospheric pressure and the pressure loss at the catalyst or the muffler downstream of the DPF 4. Therefore, the pressure just downstream of the DPF 4 can be considered constant in the case where certain measuring accuracy is required. Therefore, the map used in the first embodiment can be converted into the map for the second embodiment by obtaining the pressure loss in advance. Alternatively, the atmospheric pressure may be employed as the pressure just downstream of the DPF 4. The measuring accuracy can be increased by obtaining the degree of the variation in the pressure loss in advance.

Instead of the accelerator position change rate α', any other quantity that varies in accordance with the measuring accuracy of the PM collection quantity can be employed. For instance, the engine rotation speed or a rate of change in the vehicle velocity can be employed.

The discharge quantity of the exhaust particulate matters from the engine main body 1 is calculated based on the fuel injection quantity and the smoke guard injection quantity as the state quantities representing the operating state of the engine main body 1. Alternatively, any other state quantities representing the operating state of the engine main body 1 can be employed.

The present invention should not be limited to the disclosed embodiments, but may be implemented in many other ways without departing from the spirit of the invention.

What is claimed is:

1. An exhaust gas cleaning system for an internal combustion engine having a particulate filter, which is disposed in an exhaust pipe for collecting exhaust particulate matters included in the exhaust gas discharged from cylinders of an engine main body and is regenerated at a predetermined timing by eliminating the collected exhaust particulate matters, the system comprising:

passing state detecting means for detecting a passing state of the exhaust gas through the particulate filter;

operating state detecting means for detecting an operating state of the engine main body;

measuring accuracy determination value calculating means for calculating a measuring accuracy determination value based on the detected operating state or the detected passing state;

measuring accuracy determining means for determining whether the measuring accuracy of a collection quantity of the collected exhaust particulate matters is higher than a threshold measuring accuracy or not by comparing the measuring accuracy determination value with a predetermined value;

first collection quantity calculating means for calculating the collection quantity based on the detected passing state of the exhaust gas when the measuring accuracy is determined to be higher than the threshold measuring accuracy;

collection quantity increment value calculating means for calculating a discharge quantity of the exhaust particulate matters discharged from the engine main body per unit time based on the detected operating state of the engine main body and for calculating a collection quantity increment value per unit time from the calculated discharge quantity per unit time when the measuring accuracy is determined to be lower than the threshold measuring accuracy;

second collection quantity calculating means for calculating the collection quantity by adding the collection quantity increment value to the previous collection quantity when the measuring accuracy is determined to be lower than the threshold measuring accuracy;

regeneration determining means for determining whether the collection quantity, which is calculated by the first or second collection quantity calculating means, is greater than a threshold collection quantity or not; and regeneration performing means for performing the regeneration of the particulate filter if the collection quantity is determined to be greater than the threshold collection quantity.

2. The exhaust gas cleaning system as in claim 1, wherein;

the collection quantity increment value calculating means calculates concentration of the exhaust particulate matters included in the exhaust gas discharged from the engine main body based on the detected operating state of the engine main body, and calculates the discharge quantity of the exhaust particulate matters discharged from the engine main body per unit time by multiplying a flow rate of the exhaust gas by the concentration of the exhaust particulate matters.

3. The exhaust gas cleaning system as in claim 1, wherein;

the collection quantity increment value calculating means calculates the collection quantity increment value per unit time by multiplying the discharge quantity of the exhaust particulate matters per unit time by predetermined collection efficiency.

4. The exhaust gas cleaning system as in claim 2, wherein;

the collection quantity increment value calculating means selects the concentration of the exhaust particulate matters from a group of discrete values.

5. The exhaust gas cleaning system as in claim 1, wherein;

the measuring accuracy determination value calculating means calculates a rate of change with time of a state quantity representing the operating state of the engine main body as the measuring accuracy determination value.

6. The exhaust gas cleaning system as in claim 1, wherein;

the first collection quantity calculating means calculates the collection quantity based on pressure of the exhaust gas, which changes in accordance with the collection quantity of the exhaust particulate matters, and a flow rate of the exhaust gas passing through the particulate filter, and the measuring accuracy determination value calculating means calculates the flow rate of the exhaust gas passing through the particulate filter as the measuring accuracy determination value.

* * * * *